May 8, 1962    F. W. KINSMAN    3,033,336
SPRING CLUTCH
Filed Dec. 27, 1960    2 Sheets-Sheet 1
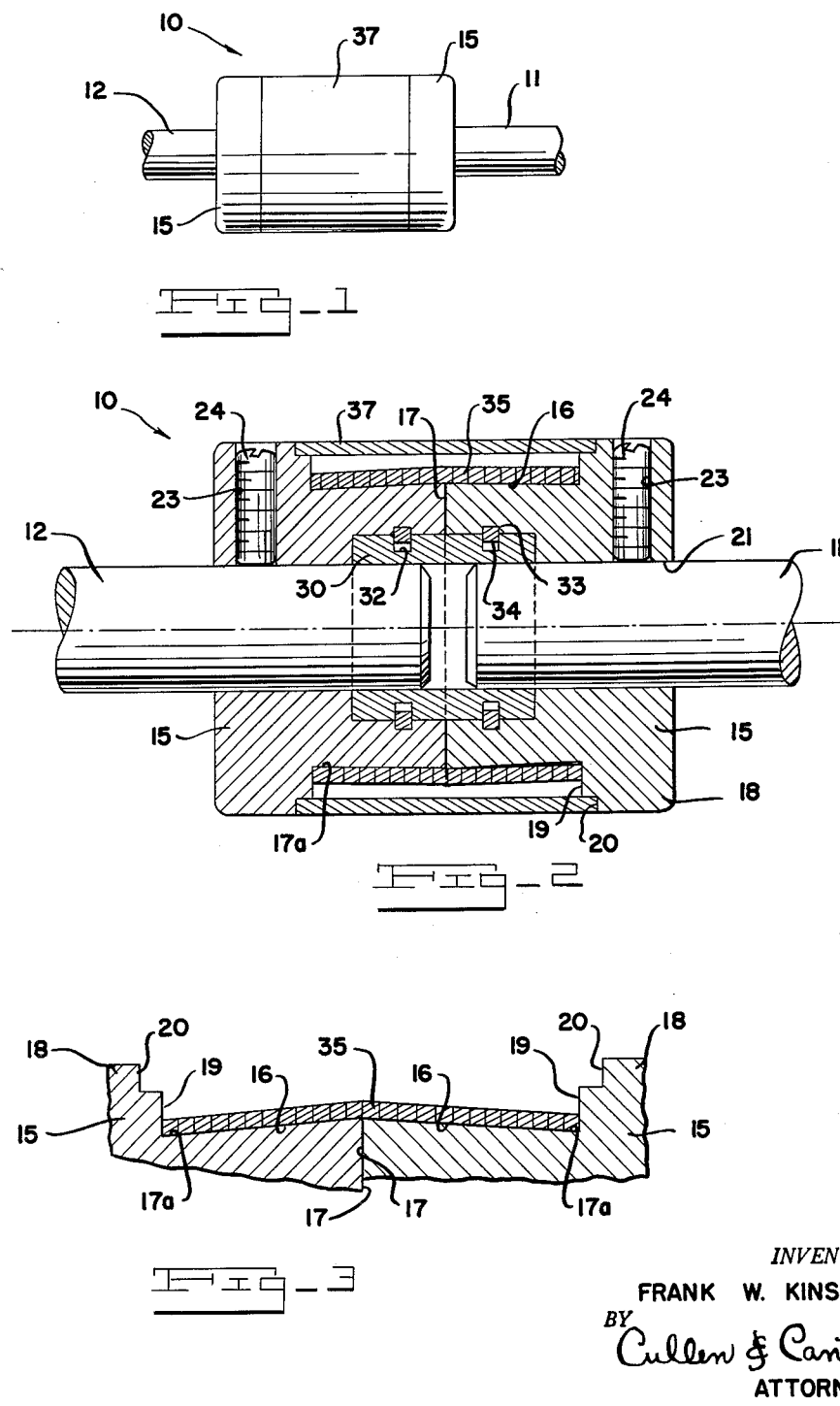
INVENTOR.
FRANK W. KINSMAN
BY Cullen & Cantor
ATTORNEYS

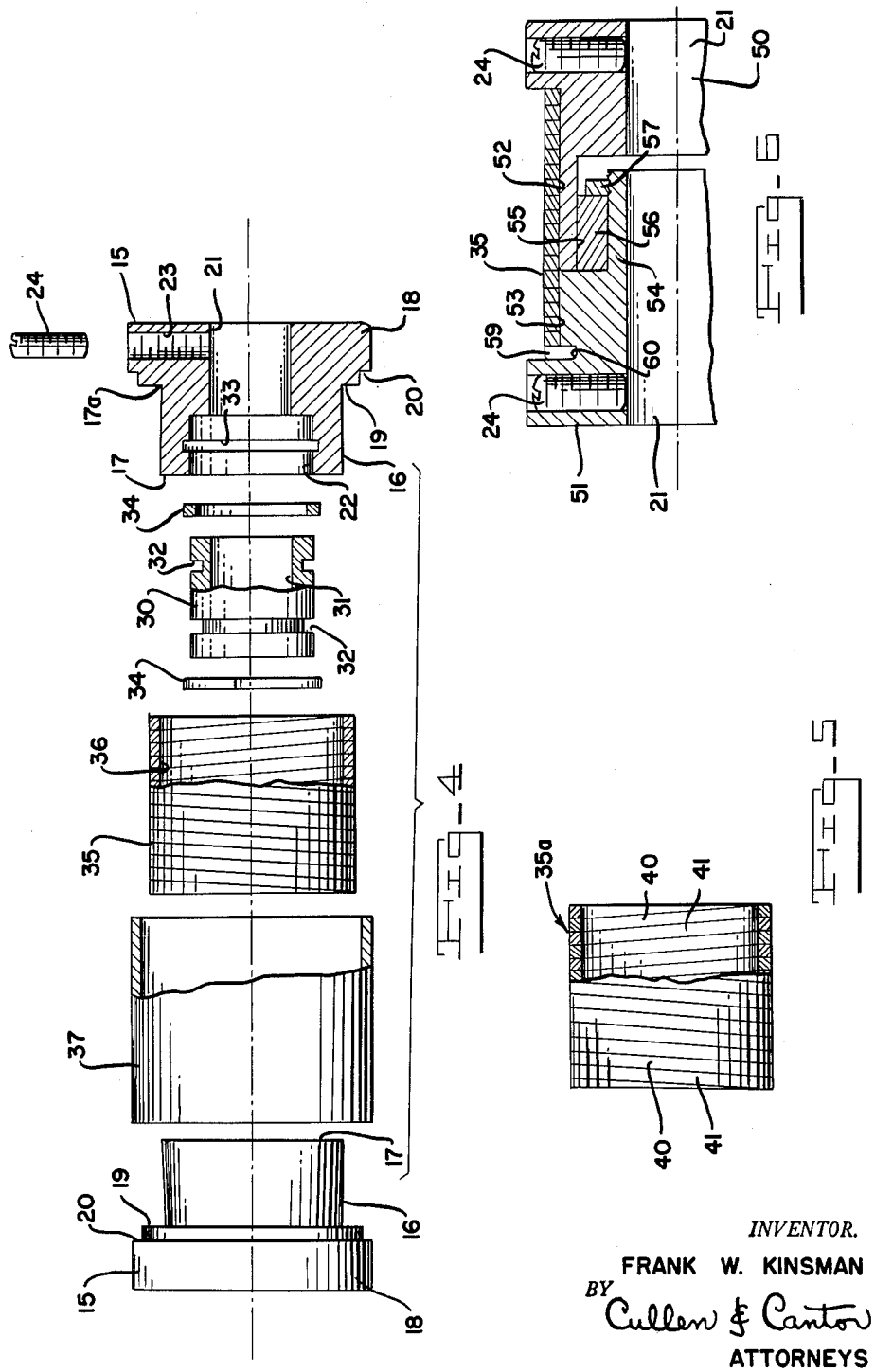

United States Patent Office 3,033,336
Patented May 8, 1962

3,033,336
SPRING CLUTCH
Frank W. Kinsman, 149 Pleasant Way, Penfield, N.Y.
Filed Dec. 27, 1960, Ser. No. 78,419
3 Claims. (Cl. 192—41)

This invention relates to a spring clutch and more particularly to a spring type over-running coupling.

It is conventional to interconnect two rotating shafts or the like by a clutch mechanism wherein one shaft may rotate independently of the second shaft but, upon reversal of its direction of rotation, will couple to the second shaft so that both lock together and rotate together. Presently available over-running clutches are for the most part relatively expenive and, particularly, are subject to a substantial amount of backlash. Backlash normally refers to the amount of angular movement or rotation of one shaft relative to the other before the two shafts lock together for movement together.

Hence, it is an object of this invention to form an over-running type of clutch using a spring locking mechanism, which clutch is relatively inexpensive, has a long life and a minimum of backlash.

A further object of this invention is to form a spring over-running clutch as a small unit package which can be quickly installed and removed where needed and which requires no disassembly or assembly of parts in use and in installation.

These and other objects and advantages of this invention will become apparent upon reading the following description, of which the attached drawings form a part.

In these drawings:

FIG. 1 is a plan view of the clutch interconnecting two rotatable shafts.

FIG. 2 is an enlarged cross-sectional view of the clutch mechanism.

FIG. 3 is an enlarged fragmentary detail showing the tapered hubs, with the tapers greatly exaggerated for illustrative purposes.

FIG. 4 is an exploded view, partially in cross-section.

FIG. 5 shows a modified form of spring, and

FIG. 6 shows a modified clutch construction.

As shown in FIG. 1, the clutch 10 is used to interconnect two rotatable shafts 11 and 12. It could also be used to interconnect a shaft to some cam or gear or the like or merely to interconnect two relatively rotatable objects.

This clutch is formed of two, substantially identical hubs 15, each having a substantially cylindrical end portion 16. The two hubs are axially aligned, end to end, so that their facing ends 17 are in contact or are closely adjacent to each other.

Preferably, the end portions 16 are not true cylinders but rather are tapered slightly, radially inwardly from their adjacent ends 17 towards their opposite remote ends 17a (see FIG. 4) so that, in a sense, they are frusto-conical in shape although the degree of taper is very slight, preferably only a few thousands of an inch per inch of axial length, so that the surface appears to be substantially cylindrical.

The opposite end of each hub is enlarged at 18 to provide a shoulder 19 at the ends of each end portion 16 and a rabbet 20 adjacent to the shoulder.

Each hub is provided with a central aperture or opening 21, of a size to receive one of the shaft 11 or 12 and, in addition, each hub is provided with a bore 22 opening into its end 17, with the bores 22 being of a greater diameter than the apertures 21. To secure the shaft in the apertures, locking means are provided, in the form of threaded openings 23 extending radially through the enlarged portions 18 and set screws 24 threadedly engaged within the threaded opening to press against the shafts.

A bushing 30 is provided for interconnecting the two hubs so that they remain axially aligned and rotatable relative to each other. The bushing is shaped as a tubular cylinder with a central opening 31 having the same diameter as the hub apertures. The ends of the bushing are provided with annular grooves 32 which are in radial alignment with annular grooves 33 formed in each of the bores 22.

Annular, split, snap rings 34 are fitted into each adjacent pair of grooves 32 and 33 to lock the bushing ends within their respective bores. The parts are assembled by simply squeezing the resilient rings tightly into the grooves 32 and then pushing the bushing ends into the respective bores so that the rings expand into grooves 33. The bushing fits relatively loosely within the bores so that the hubs can rotate relative to the bushing.

The cylindrical portions are surrounded by a closely wound helical coil spring 35 which has a uniform internal diameter. This spring is preferably formed of square, or rectangular in cross-section, springy wire of a uniform size and shape and uniformly coiled into the helical shape. Its internal diameter is slightly smaller than or equal to the smallest diameter of the hub, that is, at end 17a, so that the spring internal wall surface 36 completely engages the hubs. Hence, the spring diametrical interference with the hubs is progressively greater from the ends 17a to the ends 17, as shown in FIG. 3, which illustrates the clutch in both over-running position and also in clutching position.

A tubular cover 37 is arranged to surround the spring and fit into the rabbets 20 loosely so that the hubs may be rotated relative to the cover. The rabbets can be omitted and cover arranged to loosely fit directly around the spring to ride thereon.

In operation, the two hubs may rotate axially relative to each other so long as they are rotated in the direction opposite to the winding of the spring. For example, shaft 12 could be held stationary and shaft 11 rotated in an angular direction opposite to the winding of the spring. This is called over-running. With this relative rotation, the frictional contact between the spring and the hub surfaces is such that the spring tends to unwind enough to cause the spring to expand, hence permitting relative rotation of the hubs 15.

When clutching is desired, the hubs are relatively rotated in the same direction as the winding of the spring, as for example, shaft 12 is held stationary and shaft 11 reversed in direction so as to rotate in the same direction as the spring winding. The frictional contact or drag between the hub surfaces and the spring immediately tightly winds and constricts the spring radially inwardly to tightly grip the two surfaces 16 and hence, lock the hubs together for rotation together.

When the shaft 11 is again reversed, that is, rotation against the direction of winding of the spring, the spring loosens or unwinds and the hubs are free to rotate relative to each other again.

Because the hubs are tapered, an increasing over-running drag is provided from the hub ends 17a to ends 17 and this compensates for inaccuracies and variations in the spring loops, such as varying cross-sections, elasticity, diameter of spring, etc., and insures that the spring does not unwind out of contact with the hubs, but rather maintains full surface contact. With voids or spaces between the spring and hubs substantially eliminated, backlash is minimized.

FIG. 5 shows a modified form of spring wherein, instead of being formed of a single wire, the spring is formed of two separate, identical wires 40 and 41, wound together to form a single thickness cylindrical spring with the adjacent loops of the spring alternately between wires 40 and 41. This double wire form of spring reduces the possibility of spring failure due to the spring wire being weak at any point or improperly made or otherwise imperfect. Here, one spring wire compensates for weaknesses in the other spring wire to guarantee a longer life despite the possibility of inherent weakness in the wire.

FIG. 6 illustrates a modification wherein the hubs 50 and 51, preferably having tapered end portions 52 and 53 respectively, are interconnected by a bushing portion 54, formed integral with hub 51 and fitted into bore 55 in hub 50. A bearing 56 surrounds the bushing portion and fits within the space between the bushing portion and the wall of the bore, the bearing being locked in place by a nut 57 threaded on the end of the bushing portion. Also, the spring 35 is provided with an inwardly bent tang 59 which fits into a slot 60 formed in hub 51 to prevent relative rotation between hub 51 and the spring, but permit relative rotation between the spring and the hub 50, which may be designated as the over-running hub.

This invention may be further developed within the scope of the following attached claims. Accordingly, it is desired that the foregoing description be read as being merely illustrative of an operative embodiment of this invention and not in a strictly limiting sense.

I now claim:

1. A spring clutch comprising two substantially cylindrically shaped hubs arranged in end to end, axial alignment, with their facing ends being closely adjacent; at least one of the hubs being slightly tapered radially inwardly from its end which is adjacent to the other hub toward its opposite, remote end; both hubs being surrounded by a closely wound, helical coil spring having a normal uniform inner diameter which is no larger than the smallest diameter of the hubs and with the entire length of the spring normally being in uninterrupted contact with the outer surfaces of the two hubs; the hubs being axially rotatable relative to each other when relatively rotated in a direction opposite to the direction of winding of the spring, and the hubs being axially rotatable together as a single unit when relatively rotated in the direction of the winding of the spring due to the spring radially constricting to thereby lock the hubs together.

2. A spring clutch comprising two substantially cylindrically shaped hubs arranged in end to end axial alignment with their facing ends being closely adjacent; each of said hubs being slightly tapered radially inwardly from its end which is adjacent to the other hub towards its opposite, remote end; both hubs being surrounded by a closely wound, helical coil spring having a normal uniform inner diameter which is no larger than the smallest diameter of the hubs and with the entire length of the spring normally being in uninterrupted contact with the outer surfaces of the two hubs; the hubs being axially rotatable relative to each other when relatively rotated in a direction opposite to the direction of winding of the spring, and the hubs being axially rotatable together as a single unit when relatively rotated in the direction of the winding of the spring due to the spring radially constricting to thereby lock the hubs together.

3. A spring clutch comprising a first and a second substantially cylindrically shaped hub, the hubs being arranged in end to end, axial alignment with their facing ends being closely adjacent; said first hub being slightly tapered radially inwardly from its end which is adjacent to the second hub towards its opposite, remote end; both hubs being surrounded by a closely wound, helical coil spring having a normal uniform inner diameter which is no larger than the smallest diameter of the hubs and with the entire length of the spring normally being in uninterrupted contact with the outer surfaces of the two hubs; the end of the spring at said second hub being secured thereto at a point remote from the end facing the first hub; said hubs being axially rotatable relative to each other when relatively rotated in a direction opposite to the direction of winding of the spring, and the hubs being axially rotatable together as a single unit when relatively rotated in the direction of the winding of the spring due to the spring radially constricting to thereby lock the hubs together.

References Cited in the file of this patent

UNITED STATES PATENTS

| | | |
|---|---|---|
| 459,042 | King et al. | Sept. 8, 1891 |
| 850,981 | Tillotson | Apr. 23, 1907 |
| 1,300,398 | Jaegar | Apr. 15, 1919 |
| 1,909,420 | Palmgren | May 16, 1933 |
| 2,004,650 | Collyear et al. | June 11, 1935 |
| 2,242,379 | Wahl | May 20, 1941 |